United States Patent [19]
Caperton

[11] 3,873,223
[45]* Mar. 25, 1975

[54] COUPLING MEANS FOR SEWER ROD

[76] Inventor: Charles B. Caperton, 52 Pitney Ave., Springlake, N.J. 07762

[*] Notice: The portion of the term of this patent subsequent to Dec. 18, 1990, has been disclaimed.

[22] Filed: Apr. 2, 1974

[21] Appl. No.: 457,191

Related U.S. Application Data

[63] Continuation-in-part of Ser. No. 336,928, March 1, 1973, Pat. No. 3,814,529.

[52] U.S. Cl. .................................. 403/341, 403/393
[51] Int. Cl. ............................................ F16b 7/18
[58] Field of Search ........... 403/393, 341, 340, 339, 403/331, 342; 339/47 R, 47 C, 49 R

[56] References Cited
UNITED STATES PATENTS

| | | | |
|---|---|---|---|
| 190,641 | 5/1877 | Stouffer | 24/21 UX |
| 2,168,759 | 8/1939 | Betzing | 403/342 |
| 2,319,892 | 5/1943 | Thomas | 403/341 X |
| 2,986,787 | 6/1961 | Ackermann | 403/341 X |
| 3,779,658 | 12/1973 | Caperton | 403/393 |

FOREIGN PATENTS OR APPLICATIONS

| | | | |
|---|---|---|---|
| 444,493 | 1/1949 | Italy | 403/341 |
| 1,333,159 | 1/1963 | France | 403/341 |

Primary Examiner—Andrew V. Kundrat
Attorney, Agent, or Firm—Paul & Paul

[57] ABSTRACT

Coupling means connect short individual sections of steel rod into a long continuous length of rod for clearing obstructions in underground pipe, sewers and other conduits and provides transmission of applied axial and torque forces from one rod to the next without slippage therebetween and without loss of power.

4 Claims, 5 Drawing Figures

PATENTED MAR 25 1975  3,873,223

3,873,223

COUPLING MEANS FOR SEWER ROD

CROSS-REFERENCE TO RELATED APPLICATIONS

This application is a continuation-in-part of my co-pending application, Ser. No. 336,928, filed Mar. 1, 1973, entitled "Rod Coupler," now U.S. Pat. No. 3,814,529, issued June 4, 1974.

BACKGROUND OF THE INVENTION

This invention relates to couplers for connecting together short sections of sylindrical spring-steel rod to form a continuous length of rod which may be pushed into a sewer or other pipe or conduit for the purpose of clearing obstructions therein. Each section of rod may, for example, have a length of the order of 39 inches. The continuous length of rod which results from coupling together the short sections may have a length of the order of 900–1,000 feet. At the foremost extremity of the coupled rod, a suitable tool is connected for performing a particular clearing operation. Such tool may, for example, be an auger bit, a root saw, a centrifugal cutter or any other of a large variety of tools especially adapted for the purpose. In order for the tool, particularly a cutting tool, to be effective, it is necessary for the coupled rod to be rotated axially. Thus, the couplers must be able to transmit torsional forces from one rod to the next, as well as to transmit axial forces, i.e., push and pull forces.

Couplers have been provided by the prior art, but the prior art couplers have had certain disadvantages which will be pointed out. These prior art couplers have two axially spaced holes on opposite sides of its side wall for receiving the tereminal ends of the two rod sections which are to be connected together. The rod sections, when coupled, do not physically touch each other. The connection is through the coupler. In order for the terminal end of each rod section to be inserted into the hole in the side wall of the compler, the short terminal end of the rod must be bent at right angles to its longitudinal axis. This has been possible with spring-steel rod of a diameter of ¼ inch to ⅝ inch. A demand has arisen, however, for heavier spring-steel rod and the bending at right angles of the terminal of the short terminal end of such rod presents a difficult problem.

SUMMARY OF THE INVENTION

A principal object of the present invention is to provide coupling means for sections of spring-steel rod which does not require bending of the short terminal end of each rod at right angles to its axis.

Another object is to provide coupling means in which the two rod sections connect physically with each other with the coupling means providing the necessary clamping force.

In my U.S. Pat. No. 3,779,658, issued Dec. 18, 1973, I disclose several forms of coupler, each having two elements. In my present application, the coupler has three elements.

DETAILED DESCRIPTION OF THE PREFERRED EMBODIMENTS

Referring to FIGS. 1–4, the ends of cylindrical rod sections 10 and 20 are flattened, as at 12 and 22, forming the shoulder, 17 and 27 respectively, at the junction of the flattened end and the cylindrical rod. Each of the flattened end portions 12, 22 is inclined and the terminal end thereof is bent, as at 13 and 23, at an approximate right angle to the flattened portion 12, 22. This is seen clearly in FIg. 4.

Figure 1:
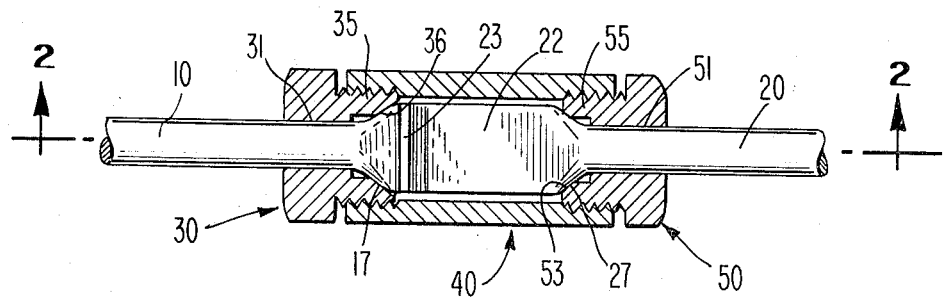
FIG. 1 is a top view, in section, of a presently preferred form of three-element coupler provided in accordance with the present invention to couple together the ends of two rod sections, the ends of which have been formed in the manner illustrated.
Figure 2:
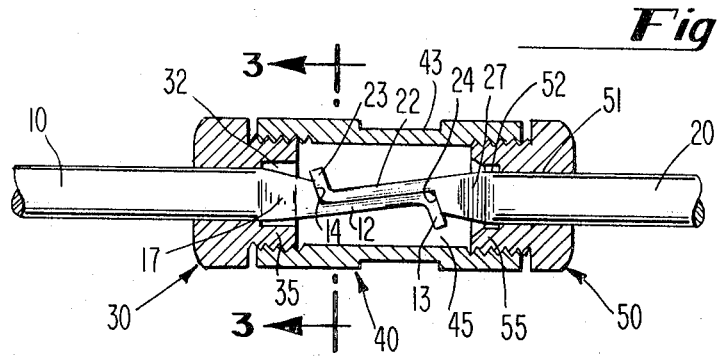
FIG. 2 is a side view, in section, looking along the line 2—2 of FIG. 1.

Referring now to FIGS. 1 and 2, the three-element coupler comprises elements 30, 40 and 50, of which element 40 is the center element and elements 30 and 50 are the end elements. Each of the coupler elements 30, 40 and 50 is generally cylindrical. The end elements 30 and 50 have shank portions 35 and 55 which are externally threaded, while the center element 40 is internally threaded at each of its two ends.

End element 30 has a circular through-hole 31, and the shank 35 of element 30 has a circular recess 32, the diameter of which, while larger than that of the through-hole 31, is less than the width of the flattened end portion 12 of the rod section 10. At the inner end of shank 35, two notches 36 are cut, at opposite sides, for receiving the shoulders 17 of the rod section 10.

The other end element 50 has a through hole 51, circular in cross-section for receiving the cylindrical portion of the rod section 20. The shank 55 of element 50 has a recess 52, circular in cross-section. The inward end of shank 55 is beveled forming an inclined shoulder 52 adapted to abut the inclined shoulder 27 of the cylindrical rod section 20.

It will be noted that the flattened ends 12 and 22 of the cylindrical rod sections 10 and 20 will not pass through the circular through holes 31 and 51 of the end coupler elements 30 and 50. Accordingly, the end elements 30 and 50 are placed on the cylindrical rod sections before the ends are flattened and formed.

To connect the rod sections 10 and 20 together, the flattened ends 12 and 22 of the two rod sections are interfitted together in the manner shown in FIG. 2, so that the forward surface of the bent terminal end 23 and 13 abut against the inclined surface 14 and 24, respectively, of the end portions of the rod. After the two rod ends are interfitted together, the end element 30 of the coupler is pushed up against the wide flattened end of rod section 10 until the inclined shoulder 17 enters the two notches 36. When this occurs, the element 30 is not thereafter rotatable on the rod section 10.

The center element 40 of the coupler is then screwed onto the element 30. Center element 40 has a recess 45 which is circular in cross-section and has a diameter corresponding to the width of the flattened ends 12, 13 and 22, 33 of the rod sections. To facilitate screwing the cylindrical center element 40 onto the end element 30, flat surfaces 43 may be provided in opposed positions on the center element.

Finally, the other end element 50 of the coupler is screwed into the center element 40 until the inclined shoulder 53 of the shank of element 50 abuts against the inclined shoulder 27 of the rod section 20.

By the three-element coupler just described, the shaped interfitted ends of the coupled rod sections 10 and 20 are held firmly together. Torsional and axial forces applied to one of the rod sections will be transmitted to the other rod section without loss. For example, if a torsional force is applied to rod section 10, the shaped end 12, 13 of rod section 10 will be unable to turn rotationally without also causing the shaped end 22, 23 of the other rod section 20 to turn rotationally to the same extent. This is because the two shaped interfitted ends of the two rod sections are prevented from spreading apart by the confining action of the circular cross-section inner wall 41 of coupler element 40. Thus, the torque force applied to rod section 10 will be transmitted through the interfitted flattened ends 22, 23 and 12, 13 to the other rod section 20. Similarly, if an axial force, in either the push or pull direction, is applied to either of the rod sections, since the interfitted ends are prevented from spreading apart in the radial direction by the confining action of the circular wall 41 of the center coupler element 40, such push or pull force will be transmitted to the other rod section through the clamped-together interfitted ends 12, 13 and 22, 23 of the rod sections.

While the coupler element 40 has been illustrated as having a center recess 45 of circular cross-section, which is a preferable shape for cost-of-manufacture reasons, it is to be understood that so far as operability is concerned the recess 45 of the center element 40 may be rectangular with dimensions corresponding to those of the flattened interfitted ends 12 and 22 of the rod sections.

Figure 5:
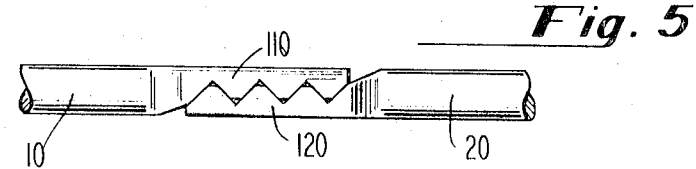
FIG. 5 is a side view illustrating an alternate form of rod section.
Figure 4:
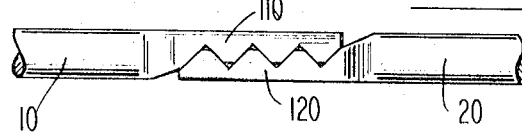
FIG. 4 is an enlarged perspective view of one end of the rod section of FIGS. 1–3.
Figure 4:
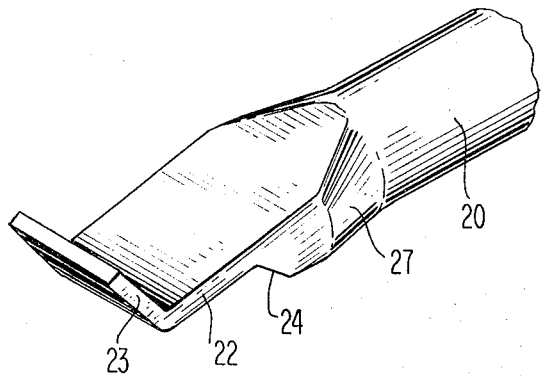
Figure 3:
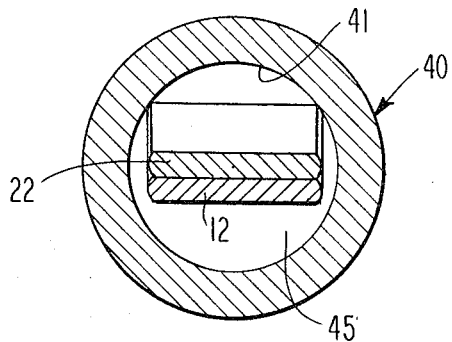
FIG. 3 is a view, in section looking along the line 3—3 of FIG. 2.

FIG. 5 illustrates a modification with respect to the shape of the flattened ends of the rod sections 10 and 20. In FIG. 5, the flattened ends 110 and 120 are formed into a sawtooth shape and interfitted together, as shown. The width of the flattened sawtooth ends 110 and 120 correspond to the diameter of the cavity 45 in the center element 40 of the 3-element coupler and the confining action of the circular inner wall 41 of the coupler element 40 is effective to prevent spreading apart of the interfitted sawtooth ends under torsional or longitudinal forces imposed on one of the rod sections, thereby effecting transfer of the force to the other rod section.

What is claimed is:

1. In combination:
  a. first and second cylindrical metal rod sections,
    a-1. each rod section having its end portions flattened and spread to form shoulders at the junction of the end portion with the cylindrical portion of said rod section;
    a-2. each rod section having its flattened end portion inclined downwardly and upwardly along the center axis of the rod section, the flattened end portion of the second rod section being inverted relative to the flattened end portion of the first rod section and interfitted therewith in overlapping manner;
  b. coupling means for connecting said interfitted rod sections axially together in overlapping manner for transmitting axial and torsional forces from one rod section to an adjacent rod section without substantial loss, said coupling means comprising:
    b-1. first, second and third coupler elements;
    b-2. said first coupler element having an externally threaded shank having an internal recess, said shank having shoulders at its inward end for bearing against said shoulders of said first rod section;
    b-3. said second coupler element being internally threaded at both ends, and adapted at one end to be screwed onto the shank of said first coupler element, said second coupler element having a center recess having a cross-sectional dimension corresponding to that of the flattened and spread end portions of said rod sections;
    b-4. said third coupler element having an externally threaded shank adapted to be screwed into the other end of said second coupler element, said shank having an internal shoulder for abutting against the shoulders of said second rod section.

2. The combination according to claim 1 wherein said center recess of said second coupler element is of circular cross-section having a diameter corresponding to the width of the flattened end portions of said rod sections.

3. The combination according to claim 2 wherein said shoulders at the inward end of said shank of first coupler element are in a pair of spaced-apart notches.

4. The combination according to claim 2 wherein said downwardly and upwardly flattened end portions are disposed at approximately a 90° angle relative to each other.

* * * * *